United States Patent
Oesterle et al.

(10) Patent No.: US 11,980,138 B2
(45) Date of Patent: May 14, 2024

(54) HAND-HELD TREATMENT SYSTEM, HAND-HELD TREATMENT DEVICE FOR A HAND-HELD TREATMENT SYSTEM, AND ATTACHMENT FOR A HAND-HELD TREATMENT SYSTEM

(71) Applicant: Andreas Stihl AG & Co. KG, Waiblingen (DE)

(72) Inventors: Markus Oesterle, Althuette (DE); Jonathan Seiz, Stuttgart (DE); Mario Kuschewski, Weil der Stadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 203 days.

(21) Appl. No.: 17/192,214

(22) Filed: Mar. 4, 2021

(65) Prior Publication Data
US 2021/0274725 A1    Sep. 9, 2021

(30) Foreign Application Priority Data
Mar. 5, 2020 (EP) .................................... 20161295

(51) Int. Cl.
*A01G 20/47*    (2018.01)
*A47L 5/14*    (2006.01)

(52) U.S. Cl.
CPC ................. *A01G 20/47* (2018.02); *A47L 5/14* (2013.01)

(58) Field of Classification Search
CPC .................................. A01G 20/47; A47L 5/14
See application file for complete search history.

(56) References Cited

U.S. PATENT DOCUMENTS 5,535,479 A * 7/1996 Pink .......................... A47L 9/32
15/330
5,711,048 A    1/1998 Pink et al.
(Continued)

FOREIGN PATENT DOCUMENTS

AU    2014411812 A1 *  5/2017 ............. A01G 20/43
CN    103774597 A    5/2014
(Continued)

OTHER PUBLICATIONS

German-language European Office Action issued in European Application No. 20161295.9 dated Jul. 16, 2020 with partial English translation (ten (10) pages).

*Primary Examiner* — Marc Carlson
(74) *Attorney, Agent, or Firm* — Crowell & Moring LLP

(57) ABSTRACT

A hand-held treatment system includes: a hand-held treatment device and at least one attachment, wherein the treatment device has a movable treatment part and an electric drive motor system for moving the treatment part. The electric drive motor system has at least one electrical path with at least one interruption. The at least one attachment has a contact bridge. The treatment device and the at least one attachment are configured for the spatial arrangement of the at least one attachment from a hazard position into a safety position, which is different from the hazard position, on the treatment device such that by the at least one attachment being in the hazard position, the at least one contact bridge does not electrically bridge the at least one interruption, and by the arrangement of the at least one attachment in the safety position, the at least one contact bridge electrically bridges the at least one interruption.

16 Claims, 6 Drawing Sheets

(56) References Cited

U.S. PATENT DOCUMENTS

| | | | | |
|---|---|---|---|---|
| 7,748,078 B2* | 7/2010 | Andriolo | ................ | A01G 20/47 15/345 |
| 8,918,951 B2* | 12/2014 | Stones | .................... | A47L 5/225 15/330 |
| 11,571,101 B2* | 2/2023 | Rosenthal | ............. | A47L 9/2889 |
| 2002/0108206 A1* | 8/2002 | Svoboda | .............. | E01H 1/0836 15/330 |
| 2003/0206801 A1* | 11/2003 | Lee | ....................... | F04D 29/703 416/247 R |
| 2008/0127448 A1* | 6/2008 | Kremsler | .................. | A47L 5/24 15/330 |
| 2008/0148513 A1* | 6/2008 | Shaffer | ................. | A01G 20/47 15/319 |
| 2008/0152487 A1* | 6/2008 | Shaffer | ................ | F04D 25/084 415/208.1 |
| 2012/0138717 A1* | 6/2012 | Svoboda | ................ | A01G 20/47 241/56 |
| 2017/0325410 A1* | 11/2017 | Gao | ....................... | A01G 20/47 |
| 2020/0306473 A1* | 10/2020 | Lee | ................... | A61M 16/0051 |
| 2021/0274725 A1* | 9/2021 | Oesterle | ................. | A01G 20/47 |
| 2022/0377989 A1* | 12/2022 | Dai | .......................... | A47L 9/22 |

FOREIGN PATENT DOCUMENTS

| | | | |
|---|---|---|---|
| CN | 105696509 B | | 4/2018 |
| CN | 109778754 A | * | 5/2019 |
| JP | 4635990 B2 | | 2/2011 |

* cited by examiner

HAND-HELD TREATMENT SYSTEM, HAND-HELD TREATMENT DEVICE FOR A HAND-HELD TREATMENT SYSTEM, AND ATTACHMENT FOR A HAND-HELD TREATMENT SYSTEM

CROSS REFERENCE TO RELATED APPLICATIONS

This application claims priority under 35 U.S.C. § 119 from European Patent Application No. 20161295.9, filed Mar. 5, 2020, the entire disclosure of which is herein expressly incorporated by reference.

BACKGROUND AND SUMMARY OF THE INVENTION

The invention relates to a hand-held treatment system, to a hand-held treatment device for a, in particular such a, hand-held treatment system, and to an attachment for a, in particular such a, hand-held treatment system.

The problem underlying the invention is to provide a hand-held treatment system, a hand-held treatment device for a hand-held treatment system and/or an attachment for a hand-held treatment system which, in particular each of which, has improved properties, in particular is safer for the user and more user-friendly.

The invention solves this problem by providing a hand-held treatment system, a hand-held treatment device, and/or an attachment, having the features of the independent claims. Advantageous further developments and/or embodiments of the invention are described in the dependent claims.

The hand-held treatment system according to the invention comprises or exhibits a hand-held treatment device and at least one attachment. The treatment device comprises or exhibits a movable, in particular rotatable, treatment part and an electric drive motor system for moving or for driving the treatment part. The electric drive motor system comprises or exhibits at least one electrical path with at least one interruption. The at least one attachment comprises or exhibits, in particular in each case, a contact bridge. The treatment device and the at least one attachment are designed or configured for the spatial arrangement of the at least one attachment, in particular having the respective contact bridge, from a, in particular respective, hazard position into a, in particular respective, safety position, which is different from the hazard position, on the treatment device in such a manner that, by the at least one attachment or owing to the at least one attachment in the hazard position, the at least one contact bridge does not electrically bridge the at least one, in particular associated, interruption, and that, by the arrangement or owing to the arrangement of the at least one attachment in the safety position, in particular from the hazard position into the safety position, in particular automatically, the at least one contact bridge electrically bridges, in particular directly, the at least one, in particular associated, interruption.

This, in particular the fact that the at least one contact bridge does not electrically bridge the at least one interruption by the at least one attachment in the hazard position, allows a movement of the treatment part by the electric drive system to be avoided or prevented, in particular automatically. Accordingly, this allows a high degree of safety for the user.

In addition, this, in particular the fact that the at least one contact bridge electrically bridges the at least one interruption by the arrangement of the at least one attachment in the safety position, allows the electric drive motor system to be configured, in particular automatically, for moving the treatment part. Accordingly, this allows a high degree of user friendliness.

In particular, the at least one contact bridge, in the event of a fault, can make it possible that the at least one contact bridge cannot electrically bridge the at least one interruption. Accordingly, this can allow a movement of the treatment part by the electric drive system to be avoided and thus allow a particularly high degree of safety for the user. This is in particular in contrast to a switch which, in the event of a fault, could possibly permit a movement of the treatment part by the electric drive system.

In particular, by the at least one attachment in the hazard position, the treatment part can be accessible to a user, in particular a hand or at least a finger of the user, and, by the arrangement of the at least one attachment in the safety position, the treatment part can be more difficult or impossible for the user to access.

The treatment device and the at least one attachment, for the release of the at least one attachment, in particular having the respective contact bridge, from the safety position, in particular without the use of a tool and/or non-destructively, can be configured in such a manner that, by the release of the at least one attachment from the safety position, in particular automatically, the at least one contact bridge is not, in particular is no longer, able to electrically bridge, in particular does not electrically bridge, the at least one interruption.

The treatment device and the at least one attachment can be configured for the mechanical connection of the treatment device and the at least one attachment, in particular at least in the safety position.

The contact bridge can be mechanically connected to another part of the attachment in such a manner that the contact bridge cannot be released from the other part of the attachment by the user, in particular without the use of a tool and/or non-destructively, in particular other than that the attachment could be released from the safety position.

The hand-held treatment system can be a hand-portable treatment system and/or the hand-held treatment device can be a hand-portable treatment device. In addition or alternatively, hand-held, in particular hand-portable, treatment system and/or hand-held, in particular hand-portable, treatment device can mean that the treatment system and/or the treatment device can have a mass of not more than 50 kilograms (kg), in particular of not more than 20 kg, in particular of not more than 10 kg, in particular of not more than 5 kg, and/or of at least 1 kg, in particular of at least 2 kg. Further in addition or alternatively, the treatment system can be a gardening, forest and/or construction treatment system and/or the treatment device can be a gardening, forest and/or construction treatment device.

In a further development of the invention, the treatment device comprises or exhibits a device housing. The treatment part is spatially arranged, in particular completely, in the device housing. The device housing has or exhibits at least one access opening to the treatment part. The at least one attachment in the safety position encloses, in particular closes off, in particular spatially, the at least one, in particular associated, access opening, in particular for the user, in particular the hand or at least the finger of the user. The at least one attachment in the hazard position does not enclose, in particular close off, in particular spatially, the at least one, in particular associated, access opening, in particular for the user. This makes it possible that, by the at least one attachment in the hazard position, the treatment part can be accessible for the user and, by the arrangement of the at least one attachment in the safety position, the treatment part can be more difficult or impossible for the user to access. In particular, the at least one attachment in the safety position can or has to close off the at least one access opening in a gas-permeable or non-sealed manner.

In a further development of the invention, the treatment device is a blower, a vacuum device and/or a shredder, in particular a vacuum shredder. In addition or alternatively, the treatment part comprises or exhibits a flow impeller wheel and/or a cutting wheel, in particular a flow impeller and cutting wheel, in particular the treatment part is a flow impeller wheel and/or a cutting wheel, in particular a flow impeller and cutting wheel. Further in addition or alternatively, the at least one attachment comprises or exhibits a blow line, in particular a blow pipe, a vacuum line, in particular a vacuum pipe, a collection bag, in particular a gas-permeable and/or non-user-permeable collection bag, and/or a safety guard, in particular a gas-permeable and/or non-user-permeable safety guard.

In one embodiment of the invention, the attachment exhibiting the safety guard is fixedly arranged or fastened on the treatment device and designed or configured for spatial adjustment, in particular pivoting, in particular swivelling, between the hazard position and the safety position. This allows a risk of the safety guard being lost to be reduced or even avoided. In addition or alternatively, this allows a high degree of user friendliness.

In one embodiment of the invention, the treatment system comprises or exhibits at least two attachments. The treatment device, one of the attachments exhibiting the safety guard in the hazard position and another of the attachments are designed or configured for the arrangement of the other attachment into the safety position of the attachment exhibiting the safety guard. This allows the treatment system, in particular the treatment device, to be multifunctional. In particular, the other attachment can exhibit the vacuum line.

In a further development of the invention, the treatment system comprises or exhibits at least two attachments. The electric drive motor system exhibits the path with at least two interruptions connected in series. The attachments have in each case the, in particular the respective, contact bridge. This allows the treatment system, in particular the treatment device, to be produced simply and thus inexpensively.

In one embodiment of the invention, the electric drive motor system comprises or exhibits a, in particular one-piece, series-connected contact piece. The series-connected contact piece comprises or exhibits two contact portions for the, in particular direct and/or electrical, contacting of the two contact bridges and a distance-compensating portion, in particular spatial, between the contact portions for compensating a tolerance of a distance between the contact bridges. This allows a simple arrangement of the attachments. In particular, the distance-compensating portion can be resilient or elastic.

In a further development of the invention, the treatment system comprises or exhibits at least two, in particular the at least two, attachments. The electric drive motor system exhibits the at least one path with at least two, in particular the at least two, interruptions. The attachments exhibit in each case the, in particular the respective, contact bridge. The treatment device and the attachments are designed or configured for arrangement into the respective safety position in mutually non-parallel, in particular orthogonal, arrangement directions. This allows a good flow, in particular airstream and/or material flow, in the treatment device.

In a further development of the invention, the treatment system comprises or exhibits at least two, in particular the at least two, attachments. The electric drive motor system exhibits the at least one path with at least two, in particular the at least two, interruptions. The attachments exhibit in each case the, in particular the respective, contact bridge. The treatment device and the attachments define, in particular spatially, an order, in particular a temporal order, for arrangement into the respective safety position and/or for release from the respective safety position. This allows a compact construction and/or intuitive handling of the treatment system, in particular of the treatment device.

In a further development of the invention, the electric drive motor system comprises or exhibits at least two, in particular one-piece, contact pieces. The contact pieces are designed or configured for the contacting, in particular the direct and/or electrical contacting, of the at least one contact bridge and are identically constructed. This allows the treatment system, in particular the treatment device, to be produced simply and thus inexpensively.

In a further development of the invention, the electric drive motor system comprises or exhibits at least one, in particular the at least one, contact piece and/or a, in particular the, series-connected contact piece. The contact piece and/or the series-connected contact piece are/is, in particular in each case, designed or configured for the contacting, in particular the direct and/or electrical contacting, of the at least one contact bridge and are mounted in a floating manner, in particular relative to a, in particular the, device housing of the treatment device. This allows a tolerance compensation and/or a risk of fretting to be reduced or even avoided.

In a further development of the invention, the contact bridge comprises or exhibits a jumper, in particular the contact bridge is a jumper. This allows a simple arrangement and/or release of the contact bridge.

In a further development of the invention, the at least one path is a power path for the transmission, in particular the electrical transmission, of drive power, in particular electrical drive power, and/or a control path for the transmission, in particular the electrical transmission, of a control signal, in particular an electrical control signal, in particular of a control current and/or a control voltage.

The hand-held treatment device according to the invention is designed or configured for a hand-held treatment system, in particular the hand-held treatment system as described hereinbefore. The treatment device exhibits a movable treatment part, in particular the movable treatment part, and an, in particular the, electric drive motor system for moving the treatment part. The electric drive motor system exhibits at least one, in particular the at least one, electrical path with at least one, in particular the at least one, interruption. The treatment device is configured for the spatial arrangement of at least one, in particular of the at least one, attachment from a, in particular the, hazard position into a, in particular the, safety position, which is different from the hazard position, on the treatment device in such a manner that, by the at least one attachment in the hazard position, at least one, in particular the at least one, contact bridge of the at least one attachment does not electrically bridge the at least one interruption, and that, by the arrangement of the at least one attachment in the safety position, the at least one contact bridge electrically bridges the at least one interruption. The treatment device allows the same advantages as described hereinbefore for the treatment system. In particular, the treatment device can be configured as described hereinbefore.

The attachment according to the invention is designed or configured for a hand-held treatment system, in particular the hand-held treatment system, as described hereinbefore. The attachment exhibits a, in particular the, contact bridge. The attachment is configured for spatial arrangement from a, in particular the, hazard position into a, in particular the, safety position, which is different from the hazard position, on a, in particular the, hand-held treatment device in such a manner that, by the attachment in the hazard position, the contact bridge does not electrically bridge an, in particular the, interruption of an, in particular the, electrical path of an, in particular the, electric drive motor system of the treatment device, and that, by the arrangement of the attachment in the safety position, the contact bridge electrically bridges the interruption. The attachment allows the same advantages as described hereinbefore for the treatment system. In particular, the attachment can be configured as described hereinbefore.

Further advantages and aspects of the invention will become apparent from the claims and from the following description of preferred exemplary embodiments of the invention, which are explained hereinbelow with reference to the figures.

DETAILED DESCRIPTION OF THE EXEMPLARY EMBODIMENTS

Figure 1:
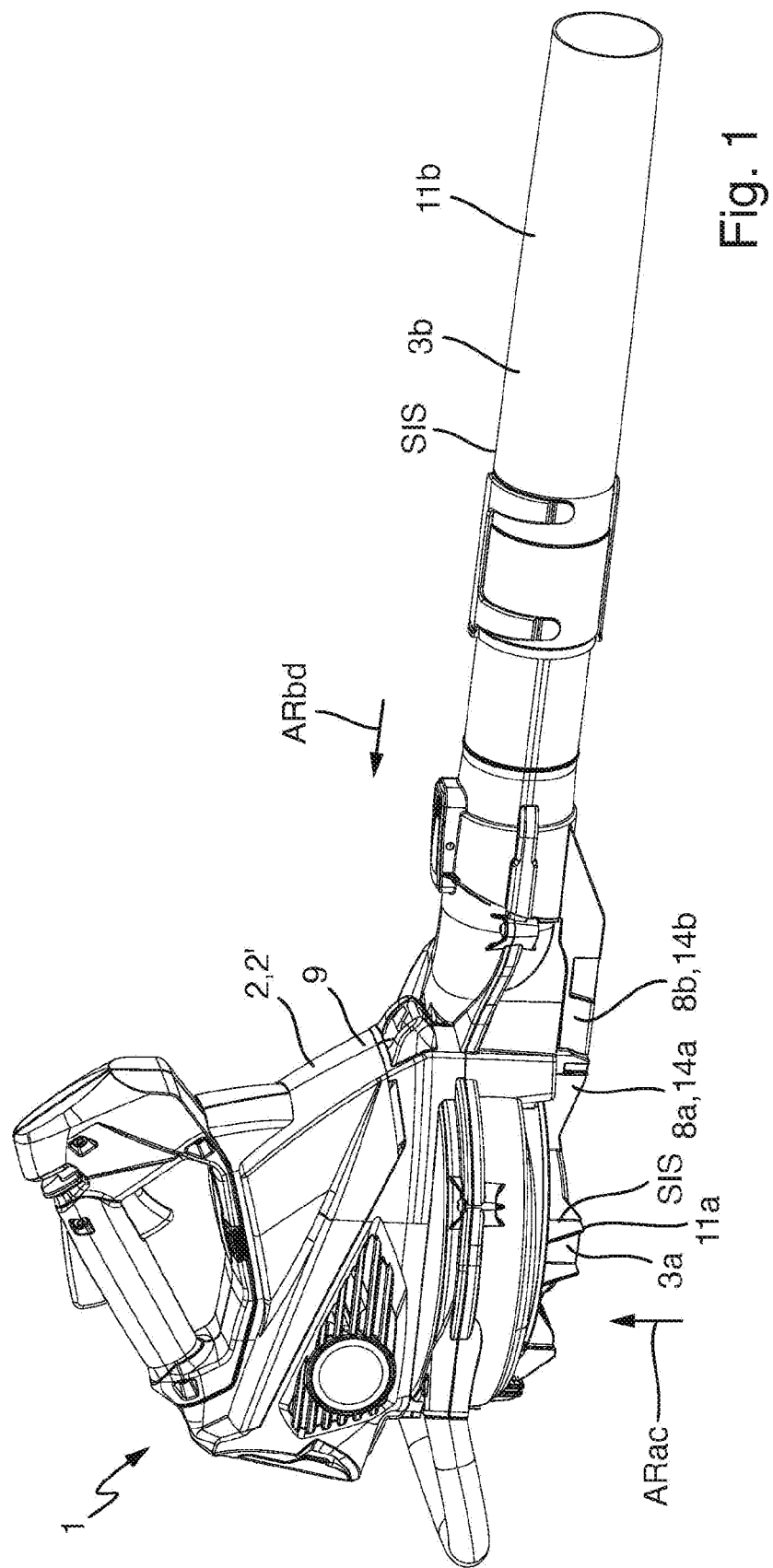
FIG. 1 is a perspective view of an exemplary hand-held treatment system according to the invention exhibiting an exemplary hand-held treatment device according to the invention and two exemplary attachments according to the invention exhibiting a blow line and a safety guard.
Figure 2:
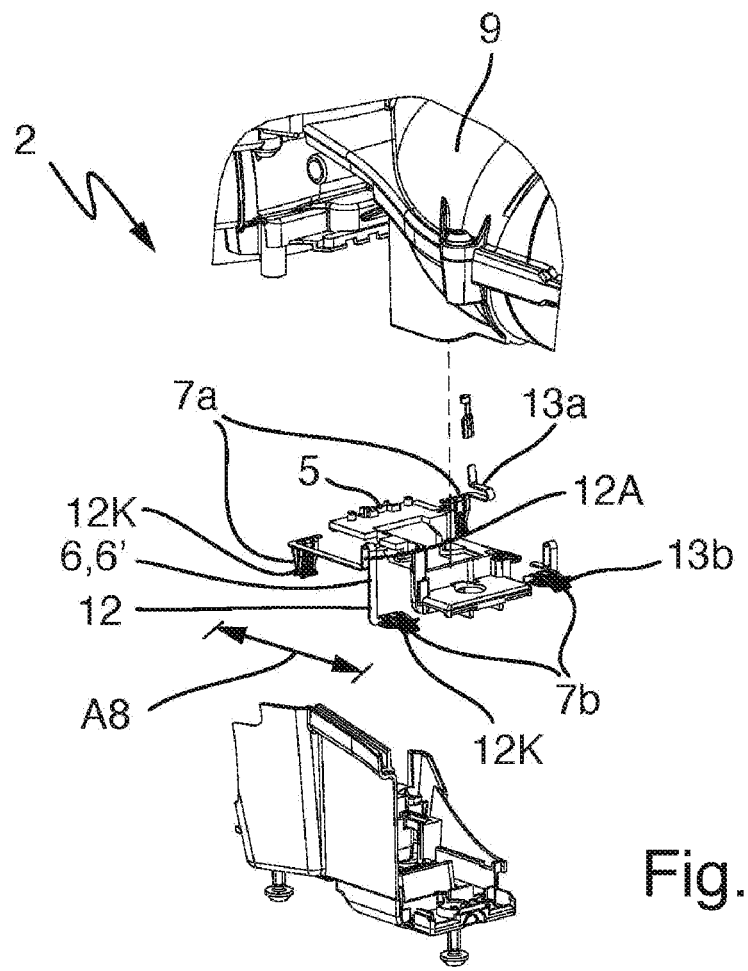
FIG. 2 is a perspective view of an electrical path with two interruptions of an electric drive motor system of the treatment device of FIG. 1.
Figure 3:
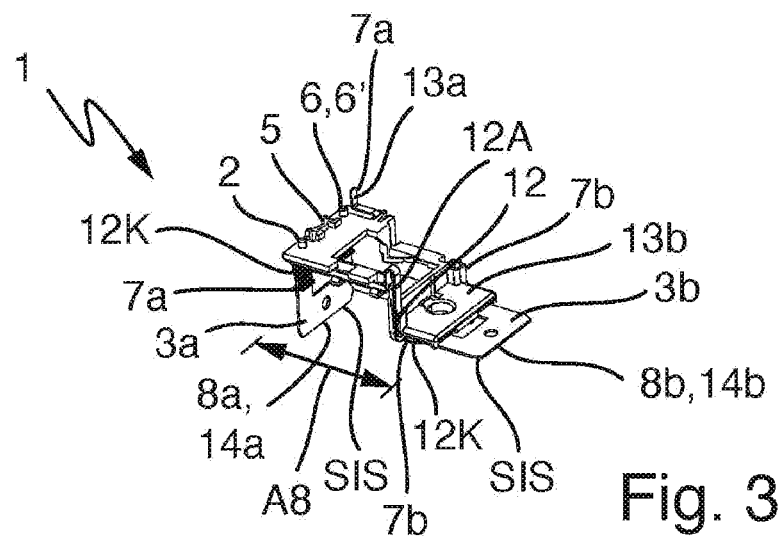
FIG. 3 is a perspective view of the path of FIG. 2 and of two contact bridges of the attachments of FIG. 1.
Figure 4:
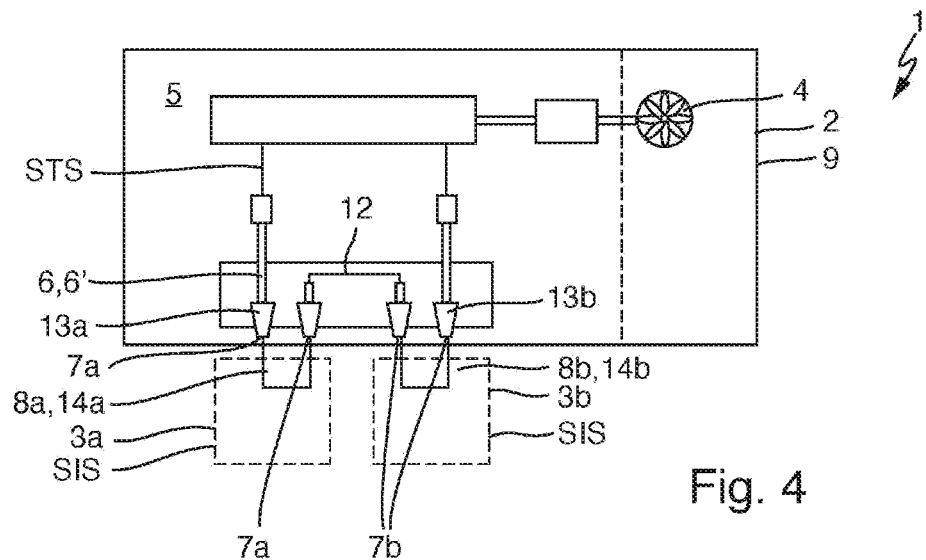
FIG. 4 shows a schematic circuit diagram of the path of FIG. 2 and of the two contact bridges of the attachments of FIG. 1.
Figure 5:
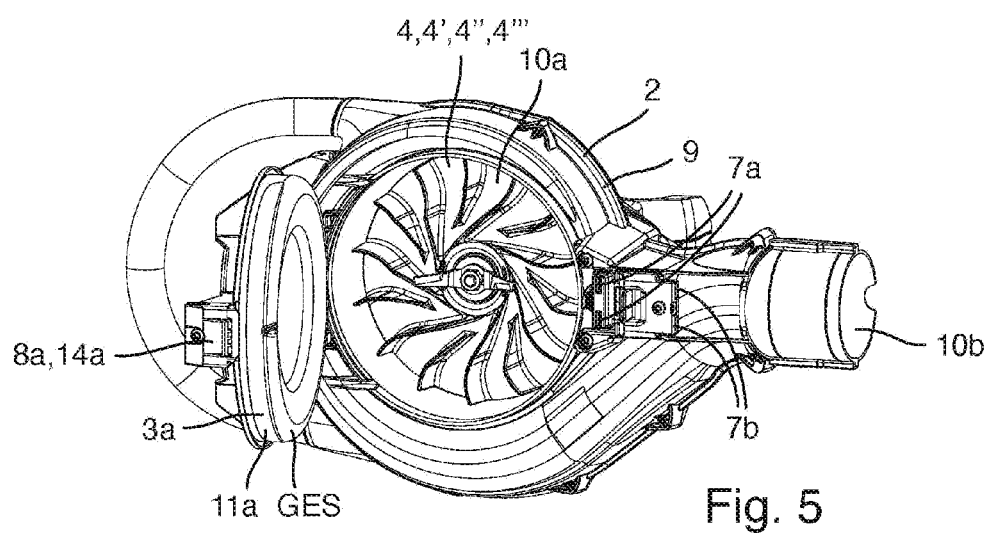
FIG. 5 is a perspective view of the treatment system of FIG. 1 exhibiting the treatment device and an attachment exhibiting the safety guard.
Figure 8:
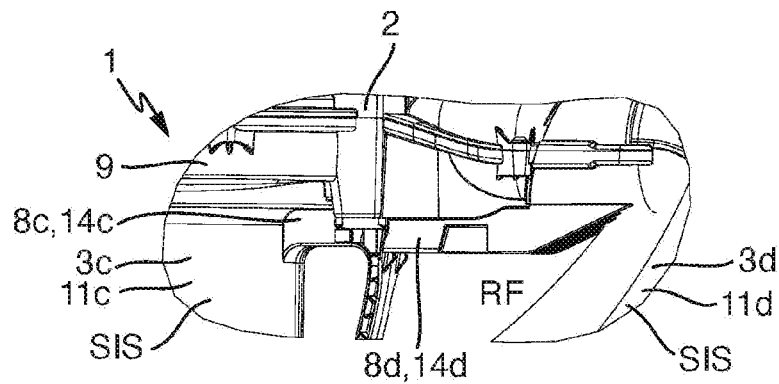
FIG. 8 is yet a further perspective view of the treatment system of FIG. 6.
Figure 9:
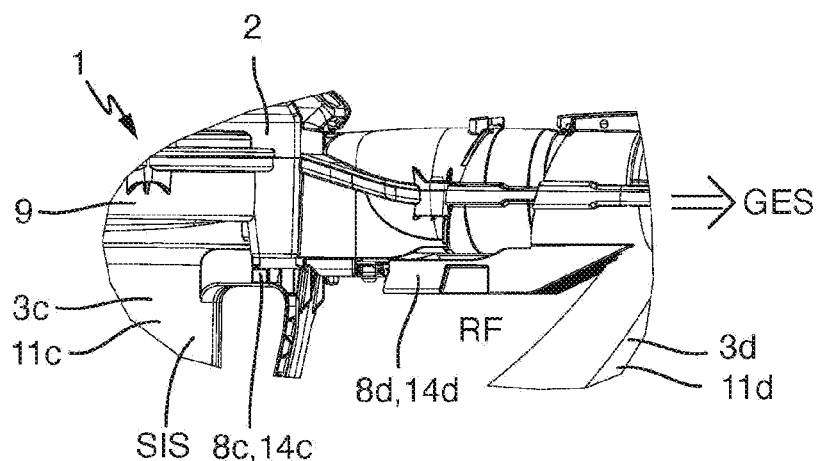
FIG. 9 is a perspective view of the treatment system of FIG. 6 with the attachment exhibiting the collection bag released.
Figure 10:
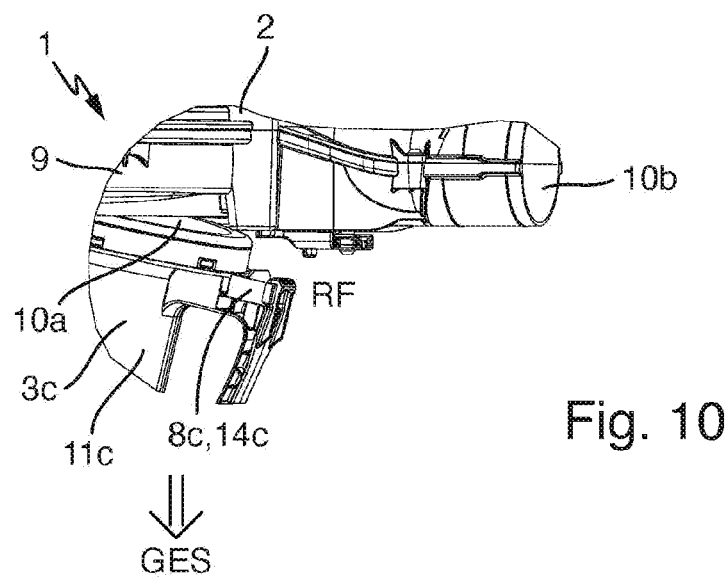
FIG. 10 is a perspective view of the treatment system of FIG. 6 with the attachment exhibiting the vacuum line released.

FIGS. 1 to 10 show a hand-held treatment system 1. The treatment system 1 exhibits a hand-held treatment device 2 and at least one attachment 3a, 3b, 3c, 3d. The treatment device 2 exhibits a movable treatment part 4 and an electric drive motor system 5 for moving the treatment part 4. The electric drive motor system 5 exhibits at least one electrical path 6 with at least one interruption 7a, 7b. The at least one attachment 3a-d exhibits a contact bridge 8a, 8b, 8c, 8d. The treatment device 2 and the at least one attachment 3a-d are configured for the spatial arrangement of the at least one attachment 3a-d from a hazard position GES into a safety position SIS, which is different from the hazard position GES, on the treatment device 2 in such a manner that, by the at least one attachment 3a-d in the hazard position GES, the at least one contact bridge 8a-d does not electrically bridge the at least one interruption 7a-b, as is shown in FIGS. 2, 5 and 10, and that, by the arrangement of the at least one attachment 3a-d in the safety position SIS, the at least one contact bridge 8a-d electrically bridges the at least one interruption 7a-b, as is shown in FIGS. 1, 3, 4 and 6 to 8.

The hand-held treatment device 2 is configured for the hand-held treatment system 1. The treatment device 2 exhibits the movable treatment part 4 and the electric drive motor system 5 for moving the treatment part 4. The electric drive motor system 5 exhibits the at least one electrical path 6 with the at least one interruption 7a-b. The treatment device 2 is configured for the spatial arrangement of the at least one attachment 3a-d from the hazard position GES into the safety position SIS, which is different from the hazard position GES, on the treatment device 2 in such a manner that, by the at least one attachment 3a-d in the hazard position GES, the at least one contact bridge 8a-d of the at least one attachment 3a-d does not electrically bridge the at least one interruption 7a-b, and that, by the arrangement of the at least one attachment 3a-d in the safety position SIS, the at least one contact bridge 8a-d electrically bridges the at least one interruption 7a-b.

The attachment 3a-d according to the invention is configured for the hand-held treatment system 1. The attachment 3a-d exhibits the contact bridge 8a-d. The attachment 3a-d is configured for spatial arrangement from the hazard position GES into the safety position SIS, which is different from the hazard position GES, on the hand-held treatment device 2 in such a manner that, by the attachment 3a-d in the hazard position GES, the contact bridge 8a-d does not electrically bridge the interruption 7a-b of the electrical path 6 of the electric drive motor system 5 of the treatment device 2, and that, by the arrangement of the attachment 3a-d in the safety position SIS, the contact bridge 8a-d electrically bridges the interruption 7a-b.

In the exemplary embodiment shown, the treatment system 1 exhibits four attachments 3a-d. In alternative exemplary embodiments, the treatment system can exhibit only a single attachment, two attachments, three attachments or at least five attachments.

Furthermore, in the exemplary embodiment shown, the electric drive motor system 5 exhibits only a single electrical path 6. In alternative exemplary embodiments, the electric drive motor system can exhibit at least two electrical paths.

Moreover, in the exemplary embodiment shown, the path 6 exhibits two interruptions 7a-b. In alternative exemplary embodiments, the path can exhibit only a single interruption or at least three interruptions.

Furthermore, in the exemplary embodiment shown, the treatment device 2 exhibits a device housing 9. The treatment part 4 is spatially arranged in the device housing 9, as is shown in FIGS. 4 and 5. The device housing 9 exhibits at least one access opening 10a, 10b to the treatment part 4. The at least one attachment 3a-d in the safety position SIS encloses, in particular closes off, the at least one access opening 10a-b. The at least one attachment 3a-d in the hazard position GES does not enclose, in particular does not close off, the at least one access opening 10a-b.

In the exemplary embodiment shown, the device housing 9 exhibits two access openings 10a-b. In alternative exemplary embodiments, the device housing can exhibit only a single access opening or at least three access openings.

Figure 6:
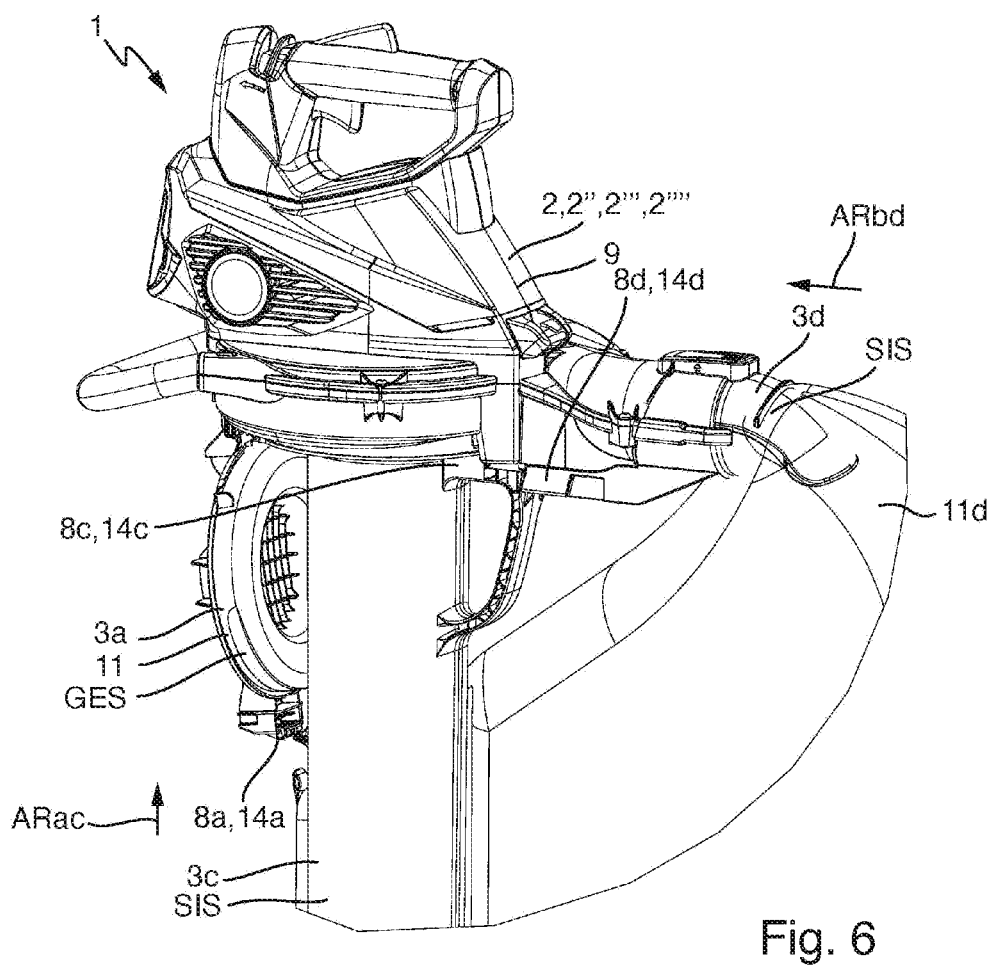
FIG. 6 is a perspective view of the treatment system of FIG. 1 exhibiting the treatment device and three attachments exhibiting the safety guard, a vacuum line and a collection bag.
Figure 7:
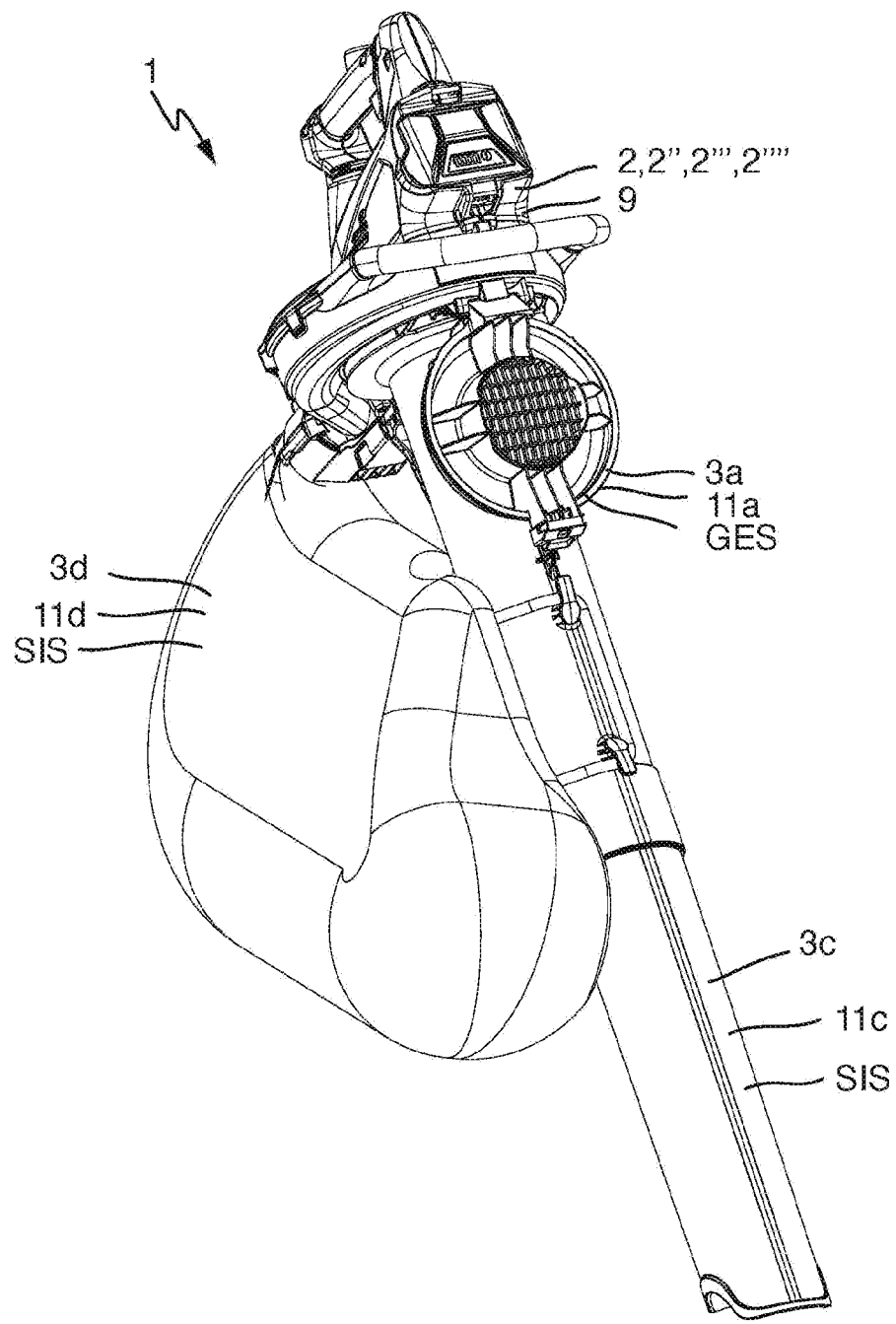
FIG. 7 is a further perspective view of the treatment system of FIG. 6.

In detail, the treatment device 2 is a blower 2', as is shown in FIG. 1, a vacuum device 2" and/or a shredder 2''', in particular a vacuum shredder 2'''', as is shown in FIGS. 6 and 7.

In addition, the treatment part 4 exhibits a flow impeller wheel 4' and/or a cutting wheel 4", in particular a flow impeller and cutting wheel 4''', in particular the treatment part 4 is a flow impeller wheel 4' and/or a cutting wheel 4", in particular a flow impeller and cutting wheel 4''', as is shown in FIG. 5.

Further in addition, the at least one attachment 3a-d exhibits a blow line 11b, in particular a blow pipe, a vacuum line 11c, in particular a vacuum pipe, a collection bag 11d and/or a safety guard 11a.

In the exemplary embodiment shown, the treatment device 2 can be used with the safety guard 11a and the blow line 11b as the blower 2' and with the vacuum line 11c and the collection bag 11d as the vacuum device 2", in particular the vacuum shredder 2'''.

In FIG. 1, the attachment 3a exhibiting the safety guard 11a is arranged in the safety position SIS on the treatment device 2. By the arrangement of the attachment 3a exhibiting the safety guard 11a in the safety position SIS, the contact bridge 8a electrically bridges the interruption 7a. In particular, the attachment 3a exhibiting the safety guard 11a in the safety position SIS closes off the access opening 10a.

Furthermore, in FIG. 1 the attachment 3b exhibiting the blow line 11b is arranged in the safety position SIS on the treatment device 2. By the arrangement of the attachment 3b exhibiting the blow line 11b in the safety position SIS, the contact bridge 8b electrically bridges the interruption 7b. In particular, the attachment 3b exhibiting the blow line 11b in the safety position SIS encloses the access opening 10b.

In FIG. 5, no attachment 3a-d is arranged in the safety position SIS on the treatment device 2. In other words: the at least one attachment 3a-d is in the hazard position GES. By the at least one attachment 3a-d in the hazard position GES, the at least one contact bridge 8a-d does not electrically bridge the at least one interruption 7a-b. In particular, the at least one attachment 3a-d in the hazard position GES does not enclose, in particular does not close off, at least one access opening 10a-b.

In FIGS. 5 to 10, the attachment 3a exhibiting the safety guard 11a is in the hazard position GES. By the attachment 3a exhibiting the safety guard 11a in the hazard position GES, the contact bridge 8a does not electrically bridge the interruption 7a. In particular, the attachment 3a exhibiting the safety guard 11a in the hazard position GES does not close off the access opening 10a.

Moreover, in FIGS. 6 to 9 the attachment 3c exhibiting the vacuum line 11c is arranged in the safety position SIS on the treatment device 2. By the arrangement of the attachment 3c exhibiting the vacuum line 11c in the safety position SIS, the contact bridge 8c electrically bridges the interruption 7a. In particular, the attachment 3c exhibiting the vacuum line 11c in the safety position SIS encloses the access opening 10a.

Furthermore, in FIGS. 6 to 8 the attachment 3d exhibiting the collection bag 11d is arranged in the safety position SIS on the treatment device 2. By the arrangement of the attachment 3d exhibiting the collection bag 11d in the safety position SIS, the contact bridge 8d electrically bridges the interruption 7b. In particular, the attachment 3d exhibiting the collection bag 11d in the safety position SIS closes off the access opening 10b.

In FIG. 9, the attachment 3d exhibiting the collection bag 11d is arranged not in the safety position SIS on the treatment device 2 but in the direction towards the hazard position GES. By the attachment 3d exhibiting the collection bag 11d being not in the safety position SIS but in the direction towards the hazard position GES, the contact bridge 8d does not electrically bridge the interruption 7b.

In FIG. 10, the attachment 3d exhibiting the collection bag 11d is in the hazard position GES. By the attachment 3d exhibiting the collection bag 11d being in the hazard position GES, the contact bridge 8d does not electrically bridge the interruption 7b. In particular, the attachment 3d exhibiting the collection bag 11d in the hazard position GES does not close off the access opening 10b.

In addition, in FIG. 10 the attachment 3c exhibiting the vacuum line 11c is arranged not in the safety position SIS on the treatment device 2 but in the direction towards the hazard position GES. By the attachment 3c exhibiting the vacuum line 11c being not in the safety position SIS but in the direction towards the hazard position GES, the contact bridge 8c does not electrically bridge the interruption 7a.

In detail, the attachment 3a exhibiting the safety guard 11a is fixedly arranged on the treatment device 2 and is configured for spatial adjustment, in particular pivoting, between the hazard position GES and the safety position SIS.

The attachment 3a exhibiting the safety guard 11a has been spatially adjusted, in particular pivoted, into the safety position SIS in FIG. 1 and into the hazard position GES in FIGS. 5 to 10.

In particular, the treatment system 1 exhibits at least two, in particular the at least two, attachments 3a-d. The attachments 3a-d exhibit in each case the contact bridge 8a-d.

In addition, the treatment device 2, one of the attachments 3a exhibiting the safety guard 11a in the hazard position GES and another of the attachments 3c, in particular exhibiting the vacuum line 11c, are configured for the arrangement of the other attachment 3c into the safety position SIS of the attachment 3a exhibiting the safety guard 11a.

The other attachment 3c has been arranged in FIGS. 6 to 9 into the safety position SIS of the attachment 3a exhibiting the safety guard 11a.

In the exemplary embodiment shown, the attachments 3b-d exhibiting the blow line 11b, the vacuum line 11c and the collection bag 11d are not fixedly arranged on the treatment device 2 or are configured so as to be releasable from the treatment device 2, in particular without the use of a tool and/or non-destructively.

Further in addition, the electric drive motor system exhibits the, in particular at least one, path 6 with, in particular the, at least two interruptions 7a-b, which in particular are connected in series, as is shown in FIGS. 2 to 4.

In detail, the electric drive motor system 5 exhibits a series-connected contact piece 12.

In addition, the series-connected contact piece 12 exhibits two contact portions 12K for contacting the two contact bridges 8a-d, and a distance-compensating portion 12A between the contact portions 12K for compensating a tolerance of the distance A8 between the contact bridges 8a-d.

In FIG. 3, one of the contact portions 12K contacts the contact bridge 8a and another of the contact portions 12K contacts the contact bridge 8b.

Further in addition, the treatment device 2 and the attachments 3a-d are configured for arrangement into the respective safety position SIS in mutually non-parallel, in particular orthogonal, arrangement directions ARac, ARbd.

In the exemplary embodiment shown, the treatment device 2 and the attachments 3a, 3c exhibiting the safety guard 11a and the vacuum line 11c are configured, in particular arranged, for arrangement into the, in particular respective, safety position SIS in the arrangement direction ARac, and the treatment device 2 and the attachments 3b, 3d exhibiting the blow line 11b and the collection bag 11d are configured, in particular arranged, for arrangement into the, in particular respective, safety position SIS in the arrangement direction ARbd.

Further in addition, the treatment device 2 and the attachments 3a-d define an order for arrangement into the respective safety position SIS and/or for release from the respective safety position SIS, as is shown in FIGS. 8 to 10.

In the exemplary embodiment shown, the attachment 3a, 3c exhibiting the safety guard 11a or the vacuum line 11c is to be arranged into the, in particular respective, safety position SIS first and released from the, in particular respective, safety position SIS last, and the attachment 3b, 3d exhibiting the blow line 11b or the collection bag 11d is to be arranged into the, in particular respective, safety position SIS last and released from the, in particular respective, safety position SIS first.

In particular, a locking lever for the attachment 3a, 3c exhibiting the safety guard 11a or the vacuum line 11c is concealed by the attachment 3b, 3d exhibiting the blow line 11b or the collection bag 11d when arranged in the safety position SIS.

The electric drive motor system 5 further exhibits at least one contact piece 13a, 13b, in particular at least two contact pieces 13a-b. The at least one contact piece 13a-b is, in particular the contact pieces 13a-b are, configured for contacting the at least one contact bridge 8a-d.

In addition, the contact pieces 13a-b are identically constructed.

In the exemplary embodiment shown, the electric drive motor system 5 exhibits two contact pieces 13a-b. In alternative exemplary embodiments, the electric drive motor system can exhibit only a single contact piece or at least three, in particular at least four, contact pieces.

In FIG. 3, one of the contact pieces 13a contacts the contact bridge 8a and another of the contact pieces 13b contacts the contact bridge 8b.

Further in addition, the contact piece 13a-b and/or the series-connected contact piece 12 are/is mounted in a floating manner.

In particular, the treatment device 2, in particular the electric drive motor system 5, exhibits a mounting aid for mounting of the contact piece 13a-b and/or of the series-connected contact piece 12. The mounting aid remains on, in particular in, the treatment device 2 after, in terms of time, mounting.

Moreover, the contact bridge 8a-d exhibits a jumper 14a-d, in particular the contact bridge 8a-d is a jumper 14a-d.

In the exemplary embodiment shown, the jumper is a tongue-type jumper.

Furthermore, in the exemplary embodiment shown, the, in particular respective, contact bridge 8a-d is mechanically connected to another part of the, in particular respective or associated, attachment 3a-d in the form of the safety guard 11a, the blow line 11b, the vacuum line 11c and/or the collection bag 11d in such a manner that the contact bridge 8a-d cannot be released from the other part of the attachment 3a-d by the user, in particular other than that the attachment 3a-d can be released from the, in particular respective, safety position SIS.

In addition, in the exemplary embodiment shown, the at least one path 6 is a control path 6' for transmitting a control signal STS.

In alternative exemplary embodiments, the at least one path can be a power path for transmitting drive power.

In the exemplary embodiment shown, the control signal STS is transmitted, or the electric drive motor system 5 is configured to move the treatment part 4, if the, in particular two, contact bridges 8a-d electrically bridge the, in particular two, interruptions 7a-b. Otherwise, in particular if at least one of the contact bridges 8a-d does not electrically bridge at least one of the interruptions 7a-b, the control signal STS is not transmitted, or the electric drive motor system 5 is not configured to move the treatment part 4, or a movement of the treatment part 4 by the electric drive system 5 is avoided or prevented.

As is made clear by the exemplary embodiments shown and described hereinbefore, the invention provides a hand-held treatment system, a hand-held treatment device for a hand-held treatment system and/or an attachment for a hand-held treatment system which, in particular each of which, has improved properties, in particular is safer for the user and more user-friendly.

What is claimed is:

1. A hand-held treatment system, comprising:
   a hand-held treatment device and at least one attachment,
   wherein the treatment device has a movable treatment part and an electric drive motor system for moving the treatment part, wherein the electric drive motor system has at least one electrical path with at least one interruption,
   wherein the at least one attachment has a contact bridge with a jumper,
   wherein the treatment device and the at least one attachment are configured for spatial arrangement of the at least one attachment from a hazard position into a safety position, which is different from the hazard position, on the treatment device in such a manner that:
   when the at least one attachment is in the hazard position, the at least one contact bridge does not electrically bridge the at least one interruption,
   when the arrangement of the at least one attachment is in the safety position, the at least one contact bridge electrically bridges the at least one interruption via the jumper,
   wherein the electric drive motor system has at least one contact piece and/or a series-connected contact piece, and
   wherein the contact piece and/or the series-connected contact piece are/is configured to contact the at least one contact bridge and are/is mounted in a floating manner, relative to a housing of the hand-held treatment device.

2. The hand-held treatment system according to claim 1, wherein the treatment device has a device housing, wherein the treatment part is spatially arranged in the device housing, and wherein the device housing has at least one access opening to the treatment part, and wherein the at least one attachment in the safety position closes off the at least one access opening, and wherein the at least one attachment in the hazard position does not close off the at least one access opening.

3. The hand-held treatment system according to claim 1, wherein at least one of:

the treatment device is a blower, a vacuum device and/or a shredder, the treatment part has a flow impeller wheel and/or a cutting wheel, or the at least one attachment has a blow line, a vacuum line, a collection bag and/or a safety guard.

4. The hand-held treatment system according to claim 3, wherein the attachment with the safety guard is fixedly arranged on the treatment device and is configured for spatial adjustment between the hazard position and the safety position.

5. The hand-held treatment system according to claim 4, wherein the treatment system has at least two attachments, wherein the treatment device, one of the attachments with the safety guard in the hazard position and another of the attachments are configured for the arrangement of the other attachment into the safety position of the attachment with the safety guard.

6. The hand-held treatment system according to claim 1, wherein the treatment system has at least two attachments, wherein the electric drive motor system has the path with at least two interruptions connected in series, and wherein the attachments in each case have the contact bridge.

7. The hand-held treatment system according to claim 6, wherein the electric drive motor system has a series-connected contact piece, wherein the series-connected contact piece has two contact portions for contacting the two contact bridges and a distance-compensating portion between the contact portions for compensating a tolerance of a distance between the contact bridges.

8. The hand-held treatment system according to claim 1, wherein the treatment system has at least two attachments, wherein the electric drive motor system has the at least one path with at least two interruptions, and wherein the at least two attachments in each case have the contact bridge, and wherein the treatment device and the at least two attachments are configured for arrangement into the respective safety position in mutually non-parallel arrangement directions.

9. The hand-held treatment system according to claim 1, wherein the treatment system has at least two attachments, wherein the electric drive motor system has the at least one path with at least two interruptions, and wherein each of the at least two attachments have a contact bridge, and wherein the treatment device and the at least two attachments define an order for arrangement into the respective safety position and/or for release from the respective safety position.

10. The hand-held treatment system according to claim 1, wherein the electric drive motor system has at least two contact pieces, wherein the contact pieces are configured for contacting the at least one contact bridge and are identically constructed.

11. The hand-held treatment system according to claim 1, wherein the at least one path is a power path for transmitting drive power and/or a control path for transmitting a control signal.

12. The hand-held treatment system according to claim 1, wherein the contact piece and/or the series-connected contact piece comprises two contact portions configured to electrically contact the two contact bridges and a distance-compensating portion.

13. A hand-held treatment device for a hand-held treatment system, wherein the hand-held treatment device comprises:

a movable treatment part and an electric drive motor system for moving the movable treatment part, wherein the electric drive motor system has the at least one electrical path with the at least one interruption, and wherein the hand-held treatment device is configured for the spatial arrangement of at least one attachment from a hazard position into a safety position, which is different from the hazard position, on the hand-held treatment device in such a manner that:

when the at least one attachment is in the hazard position, at least one contact bridge of the at least one attachment does not electrically bridge the at least one interruption, and when the arrangement of the at least one attachment is in the safety position, the at least one contact bridge having a jumper electrically bridges the at least one interruption via the jumper, wherein the electric drive motor system has at least one contact piece and/or a series-connected contact piece, and wherein the contact piece and/or the series-connected contact piece are/is configured to contact the at least one contact bridge and are/is mounted in a floating manner, relative to a housing of the hand-held treatment device.

14. The hand-held treatment device according to claim 13, wherein the contact piece and/or the series-connected contact piece comprises two contact portions configured to electrically contact the two contact bridges and a distance-compensating portion.

15. An attachment for a hand-held treatment device, wherein the attachment comprises:

a contact bridge with a jumper, wherein the attachment is configured for spatial arrangement from a hazard position into a safety position, which is different from the hazard position, on the hand-held treatment device in such a manner that:

when the attachment is in the hazard position, the contact bridge does not electrically bridge an interruption of the electrical path of an electric drive motor system of the hand-held treatment device, when an arrangement of the attachment is in the safety position, the contact bridge electrically bridges the interruption via a jumper, wherein the electric drive motor system has at least one contact piece and/or a series-connected contact piece, and wherein the contact piece and/or the series-connected contact piece are/is configured to contact the at least one contact bridge and are/is mounted in a floating manner, relative to a housing of the hand-held treatment device.

16. The attachment for a hand-held treatment device according to claim 15, wherein the contact piece and/or the series-connected contact piece comprises two contact portions configured to electrically contact the two contact bridges and a distance-compensating portion.

* * * * *